United States Patent Office 3,700,555
Patented Oct. 24, 1972

3,700,555
METHOD AND APPARATUS FOR LYMPHOCYTE SEPARATION FROM BLOOD
Rudolph M. Widmark, New York, Bernard Lichtenstein, Yorktown Heights, Lynn Paseltiner, Yonkers, and Jacques Padawer, Hastings-on-Hudson, N.Y., assignors to Technicon Instruments Corporation, Tarrytown, N.Y.
Filed Oct. 12, 1970, Ser. No. 79,913
Int. Cl. B01d 43/00
U.S. Cl. 195—1.8                 12 Claims

ABSTRACT OF THE DISCLOSURE

New and improved method and apparatus for the separation of lymphocytes from whole blood samples with very high, heretofore unattainable combined degrees of purity, yield and viability are provided and comprise the physiological stabilization of the white cells or leukocytes immediately upon the withdrawal of the blood from the patient, the subsequent mixture of the blood with a suitable separating agent including sensitized magnetic particles and a suitable erythrocyte sedimenting agent to form a whole-blood sample-separating agent mixture, the incubation of the whole blood sample-separating agent mixture to effect the tagging of the phagocytic leukocytes, to the substantial exclusion of the lymphocytes, by the sensitized magnetic particles through leukoadhesion, phagocytosis and clumping, respectively, the settling and removal of a major portion of the erythrocytes, passage of the incubated whole blood sample-separating agent mixture through magnetic separating means to separate the thusly tagged phagocytic cells from the lymphocytes, and the removal and collection of the thusly separated lymphocytes. The method and apparatus of the invention are fully automatable, and are particularly adapted to the separation of the lymphocytes from the whole blood samples from a plurality of different patients on a continuous flow basis.

BACKGROUND OF THE INVENTION (1) Field of the invention

This invention relates to new and improved method and apparatus for the separation of lymphocytes from whole blood samples with very high and and heretofore unattainable combined degrees of purity, yield and viability.

(2) Description of the prior art

The separation of lymphocytes from whole blood samples with very high combined degrees of purity, yield and viability is of particular advantage in the diagnosis and treatment of a very wide variety of serious human diseases.

More specifically, and since a lymphocyte is a cell with a nuleus which will, if properly stimulated, undergo mytosis or cell division, it may be understood that the addition of an appropriate compound in the nature, for example, of PHA to the separated lymphocytes will enable the performance of chromosome analysis. Too, since the lymphocyte cell membrane contains antigens, the separated lymphocytes may be utilized in the production of high quality antilymphocytic sera for therapeutic use, for the testing of immunosuppressive drugs, and for the in vitro testing of histocompatibility in tissue typing and tissue cross-matching for transplants which require lymphocytes from both the donor and recipient.

In addition, the antibody formation function of the separated lymphocytes enables the use thereof for in vitro testing for both immediate and delayed types of hypersensitivities in the nature, for example, of hay fever and tuberculosis, respectively. More generally, it may be understood that the separated lymphocytes may be utilized in the diagnosis of a wide variety of specific diseases by the mixing of the lymphocytes with the disease-causing agent and the observation of the specific response of the lymphocytes thereto.

Although a wide variety of methods and apparatus are known in the prior art for the separation of lymphocytes from blood samples, it may be understood that none of the same are effective to provide for such separation with the very high combined degrees of separated lymphocyte purity yield and viability as are essential to the successful utilization of the separated lymphocytes for many of the most beneficial and important diagnostic and therapeutic purposes discussed hereinabove. Thus, for example, it may be understood that if the viability or ratio of live lymphocytes to the overall number thereof in the separated lymphocytes is low, the same will be substantially useless for the provision of effective antilymphocytic sera.

In addition, many of the methods and apparatus of the prior art require refrigeration for preservation of the whole blood sample between the time the same is extracted from the patient and the time the lymphocytes are separated therefrom to thus render the storage and shipment of such samples both expensive and unwieldy. Further, many of the methods and apparatus of the prior art require relatively extensive pre-preparation of the whole blood sample in the nature of centrifugation or the like to obtain a requisite white blood cell ar buffy coat prior to lymphocyte separation to thus further increase the time and expense required for such separation.

Also, many of the methods and apparatus of the prior art are of inordinately complex and expensive construction and are operable in inordinately time consuming and tedious manners under the care of highly skilled technicians or the like to thus introduce the most significant disadvantages of high costs of apparatus and skilled labor, low rates of operation, unreliability and/or the need for continual apparatus checking and maintenance, and the possibility of technician error, all of which will, of course, contribute to an inordinately high cost of the lymphocyte separation procedure and give rise to the possibility of unsatisfactory lymphocyte separation.

Of additional particularly significant disadvantage with regard to the methods and apparatus for lymphocyte separation of the prior art are the facts that most of the same are operable only on a manual batch basis and that none are known which are operable to effect lymphocyte separation from a series stream of whole blood samples from different patients on a fully automatic continuous flow basis to thus render the separation of the lymphocytes from whole blood samples taken from a large plurality of different patients an extremely costly and time consuming endeavor as should be obvious.

OBJECTS OF THE INVENTION

It is, accordingly, an object of this invention to provide new and improved method and apparatus for the separation of lymphocytes from whole human blood samples with heretofore unattainable, combined very high degree of purity, yield and viability to thus render the separated lymphocytes eminently suitable for a wide variety of beneficial and important diagnostic and therapeutic uses.

Another object of this invention is the provision of a method as above which comprises a most effective and particularly convenient whole blood sample pre-preparation step.

Another object of this invention is the provision of method and apparatus as above which are readily and fully automatable to require a minimum amount of supervision by skilled technicians for the satisfactory operation thereof.

Another object of this invention is the provision of apparatus as above which require only relatively inexpensive and uncomplicated, readily available components of proven dependability in the fabrication thereof, to thereby provide for relatively low apparatus costs and relatively high apparatus reliability.

Another object of this invention is the provision of method and apparatus as above which are operated in relatively rapid manner.

A further object of this invention is the provision of method and apparatus as above which are effective to significantly reduce the overall cost of lymphocyte separation from whole blood samples.

A further object of this invention is the provision of method and apparatus as above which are particularly adapted to the separation of the lymphocytes from whole blood samples from a large plurality of different patients on a fully automatic, continuous flow basis.

SUMMARY OF THE INVENTION

As disclosed herein, the method and apparatus of the invention comprise the automatic mixing of the whole blood sample concomitant with the withdrawal thereof from the patient with a suitable physiological stabilizer in the nature of a chelating agent taking the form of the sodium or potassium salt of Ethylenediamine Tetracetic Acid, or EDTA, to thereby stabilize the white blood cells or leukocytes of said whole blood sample and inhibit coagulation through the formulation of what may be termed "EDTA blood." Separation of the lymphocytes from the thusly stabilized whole blood sample is subsequently effected by the mixture and incubation thereof with a separating agent which includes sensitized magnetic particles which function to tag the phagocytic leukocytes or white blood cells in the nature of the neutrophils, eosinophils, basophils, monocytes, and platelets, respectively, to the substantial exclusion of the lmphocytes, with said magnetic particles through the processes of leukoadhesion, phagocytosis and cell clumping, respectively. Further included in said separating agent is a sedimenting agent which enhances red cell or erythrocyte rouleaux formation thereby promoting erythrocyte sedimentation.

After incubation, the whole blood sample-separating agent mixture stream is flowed through settling means for the settling of the major portion of the erythrocytes to the bottom of the stream and the subsequent removal thereof, as by decanting.

Following this, the mixture stream of interest is flowed through magnetic separating means wherein the effect of a high gradient or non-uniform magnetic field is utilized to sweep the tagged particle-associated cells from the whole blood sample-separating agent mixture in a manner which substantially minimizes the entrapment of lymphocytes therewith. This is followed by the withdrawal of the untagged lymphocytes, along with some portion of the residual erythrocytes and blood plasma and a minimum quantity of contaminating leukocytes other than lymphocytes from the mixture stream of interest. This may be followed by hemolysis of the residual erythrocytes and the subsequent washing of the lymphocytes by conventional means.

As specifically disclosed herein, it may be understood that first and second embodiments of the method and apparatus of the invention are shown and described as applied to the fully automatic separation of the lymphocytes from the whole blood samples from a large plurality of different patients on a continuous flow basis; although it is made clear that said method and apparatus are equally applicable to such lymphocyte separation on a batch basis.

DESCRIPTION OF THE DRAWINGS

The above and other objects and advantages of this invention are believed made clear by the following detailed description thereof taken in conjunction with the accompanying drawings wherein.

DETAILED DESCRIPTION OF THE INVENTION

Figure 1:
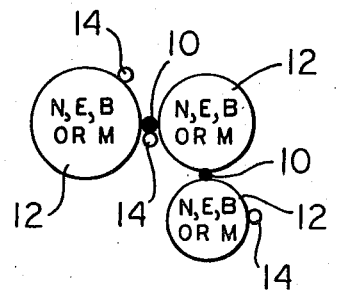
FIG. 1 is a diagram illustrating leukoadhesion between the phagocytic leukocytes of a whole blood sample and sensitized magnetic particles.

Whole human blood comprises a mixture of red blood cells or erythrocytes, white blood cells or leukocytes, platelets, and the blood plasma, respectively. The said white blood cells in turn comprise a cellular mixture of, for example, approximately 63% to 72% of neutrophils, approximately 2% to 5% of eosinophils, approximately 0% to 1% of basophils, approximately 4% to 8% of monocytes, and approximately 20% to 30% of lymphocytes, it being understood that these figures are generally applicable to the majority of healthy adults.

It is the overall function of the new and improved method and apparatus of this invention to effect the rapid and automatic separation of said lymphocytes from successive samples of whole human blood on a continuous flow basis with very high and heretofore unattainable combined degrees of purity, yield and viability. Purity may be understood to be equal to the number of lymphocytes present in the process output as divided by the total number of white blood cells or leukocytes present therein; while percent yield may be understood to be equal to the number of lymphocytes per cubic millimeter of the output sample as divided by the number of lymphocytes per cubic millimeter of the original whole blood sample, taking into account all dilutions. Viability may be understood to be equal to the number of living lymphocytes in the output as divided by the total number of lymphocytes in said output.

In accordance with the teachings of this invention, the lymphocyte separation is effected for each whole blood sample by the tagging of the phagocytic leukocytes, or neutrophils, monocytes, eosinophils and basophils, respectively, of a whole blood sample with sensitized magnetic particles to the substantial exclusion of the lymphocytes, the settling and removal of the major portion of the erythrocytes, and the magnetic separation of the thusly tagged phagocytic leukocytes, along with the majority of the platelets which will cling thereto, from the whole blood sample leaving substantially all of the lymphocytes with the residual erythrocytes and blood plasma for subsequent lymphocyte extraction therefrom by simple hemolysis and washing or the like.

In accordance with the teachings of this invention, the whole blood sample is taken from the patient by the direct hypodermic needle withdrawal thereof into a Vacutainer tube, as manufactured and marketed by Becton, Dickinson & Company of Rutherford, N.J., or a suitable sterile syringe in which is present a predetermined measured quantity of a suitable physiological stabilizer and anticoagulant in the nature of the disodium or tripotassium salts of the chelating agent EDTA, to result in the substantially immediate formation of what may be termed "EDTA blood" to physiologically stabilize the white blood cells or leukocytes of the whole blood sample and prevent clotting of the red blood cells or erythrocytes to very significant advantage. More specifically, it may be understood that the leukoadhesive phagocytic and clumping functions of the phagocytic leukocytes which provide for the tagging thereof by the sensitized magnetic particles, require the presence of free positive ions in the nature of calcium and magnesium ions for the occurrence thereof. In addition to preventing coagulation of the blood, the immediate formation as described of the "EDTA blood" results in the binding of these free positive ions by the EDTA with the result that said ions are no longer available in free form to thus substantially inhibit said leukoadhesive, phagocytic and clumping functions at this point in time. This is to say that, in the absence of the addition of the chelating agent in the nature of EDTA to the whole blood sample as described, or the alternative costly and inconvenient refrigeration of the whole blood sample to a low temperature between the time the same is withdrawn from the patient and the time the lymphocytes are to be separated therefrom, the leukoadhesive, phagocytic and clumping functions of the phagocytic leukocytes will occur unchecked with resultant white blood cell destruction and attendant significant decrease in cell viability. This will in turn result in major contamination of the lymphocytes by the dead cells which will then function to substantially inhibit the subsequent leukoadhesion and phagocytosis as must, of necessity, occur to effect lymphocyte separation in accordance with the teachings of the invention with high degrees of purity, yield and viability. Alternatively, it may be understood that said physiological stabilizer and anticoagulant may, for example, take the form of the sodium salts of CHEL DPTA and CHEL DM acid.

The separation of the lymphocytes from the "EDTA blood" is initiated by the addition thereto of a separating agent containing the following constituents to form a whole blood sample-separating agent mixture in the manner described in detail hereinbelow:

(a) Magnetic particles such as carbonyl iron particles, ferrite particles or magnetite particles in the size range of one to four microns which function, following the sensitizing thereof as described in detail hereinbelow, to effect the tagging of the phagocytic leukocytes and enable the subsequent magnetic sweeping thereof from the erythrocytes, blood plasma and lymphocytes with minimum entrapment of the latter.

(b) Free magnesium and calcium ions in the form of dissolved salts of calcium chloride and magnesium chloride which function to restore the ionic content of the "EDTA blood" to its original value by the replacement of the positive free ions bound as described hereinabove by EDTA to thereby provide an optimum ionic concentration for leukoadhesion and phagocytosis.

(c) A minimum amount of a suitable anticoagulant in the nature of heparin to insure the prevention of blood sample clotting during the time required for the lymphocyte separation process.

(d) A sensitizing agent comprising positively charged molecules of, for example, a basic poly amino acid or polypeptide in the nature the D, DL, or L forms of polylysine, polyarginine, polyornithine, polycitrulline, or the like to enhance leukoadhesion and phagocytosis by sensitizing or increasing the positive surface charge on said magnetic particles through adsorption thereto.

(e) A dextrose solution to provide energy for the phagocytosis process.

(f) An isotonic solution in the nature of Hanks BSS of the same osmotic pressure as blood plasma to provide a physiological solution medium for the separation process.

(g) A red cell sedimenting agent comprising a high molecular weight settling agent in the nature, for example, of Dextran, Ficoll, PHA or the like in combination with, for example, a small amount of the monosodium or disodium salts of EDTA to promote erythrocyte sedimentation by causing the same to aggregate and thus fall more readily to the bottom of the mixture stream.

The separation of the lymphocytes from the whole blood sample in accordance with the teachings of this invention is then effected by the incubation of the resultant whole blood sample-separating agent mixture to promote phagocytic leukocyte tagging by the sensitized magnetic particles, to the substantial exclusion of the lymphocytes, through leukoadhesion, phagocytosis and clumping, respectively, the aggregation, settling and removal as by decanting of the major portion of the erythrocytes, and the subsequent magnetic sweeping of the thusly tagged phagocytic leukocytes, and the majority of the platelets from the whole blood sample.

More specifically, and referring now to FIG. 1 which illustrates leukoadhesion and wherein the magnetic particles are indicated at 10, phagocytic leukocytes in the nature of neutrophils, monocytes, eosinophils or basophils are indicated at 12, and platelets are indicated at 14, respectively, it may be seen that in the presence of the sensitized magnetic particles 10 and the free-positive ions as provided by the added calcium chloride and magnesium chloride solutions, the outer phagocyte cell membranes of said leukocytes become sticky or adhesive and thus tend to adhere to the magnetic particles 10. In like manner, the platelets 14 may be seen to adhere to both the leukocyte 12 and the magnetic particles 10.

Figure 2:
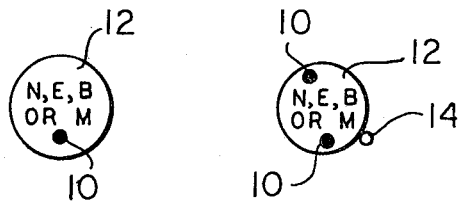
FIG. 2 is a diagram illustrating phagocytosis of sensitized magnetic particles by the live phagocytic cells.

Following this, phagocytosis will occur which, as illustrated in FIG. 2, will involve the uptake or ingestion of one or more of the sensitized, foreign magnetic particles 10 by a phagocytic leukocyte cell in the nature of a neutrophil, monocyte, eosinophil or basophil.

Figure 3:
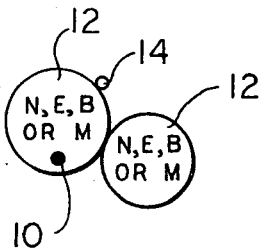
FIG. 3 illustrates one form of leukocyte clumping, including platelets.
Figure 4:
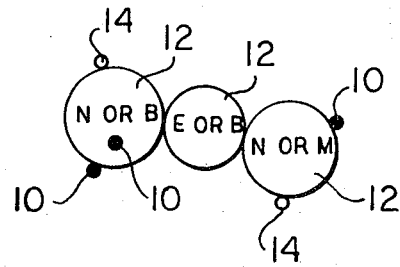
FIG. 4 illustrates another manner of leukocyte clumping, including platelets.

Tagging of the phagocytic leukocytes is completed by leukocyte clumping which, as illustrated in FIG. 3, involves the sticking of the outer phagocyte cell membrane of a neutrophil, monocyte, eosinophil or basophil to the outer cell membrane of a like leukocyte which has engulfed or ingested a magnetic particle 10 or, as illustrated in FIG. 4, involves the sticking of the phagocyte outer cell membrane of a neutrophil or monocyte which has ingested a magnetic particle 10, and has leuko-adhered to another magnetic particle 10, to a eosinophil or basophil, and the sticking of the latter in turn to a neutrophil or monocyte which has also leuko-adhered to a magnetic particle 10.

Figure 5:
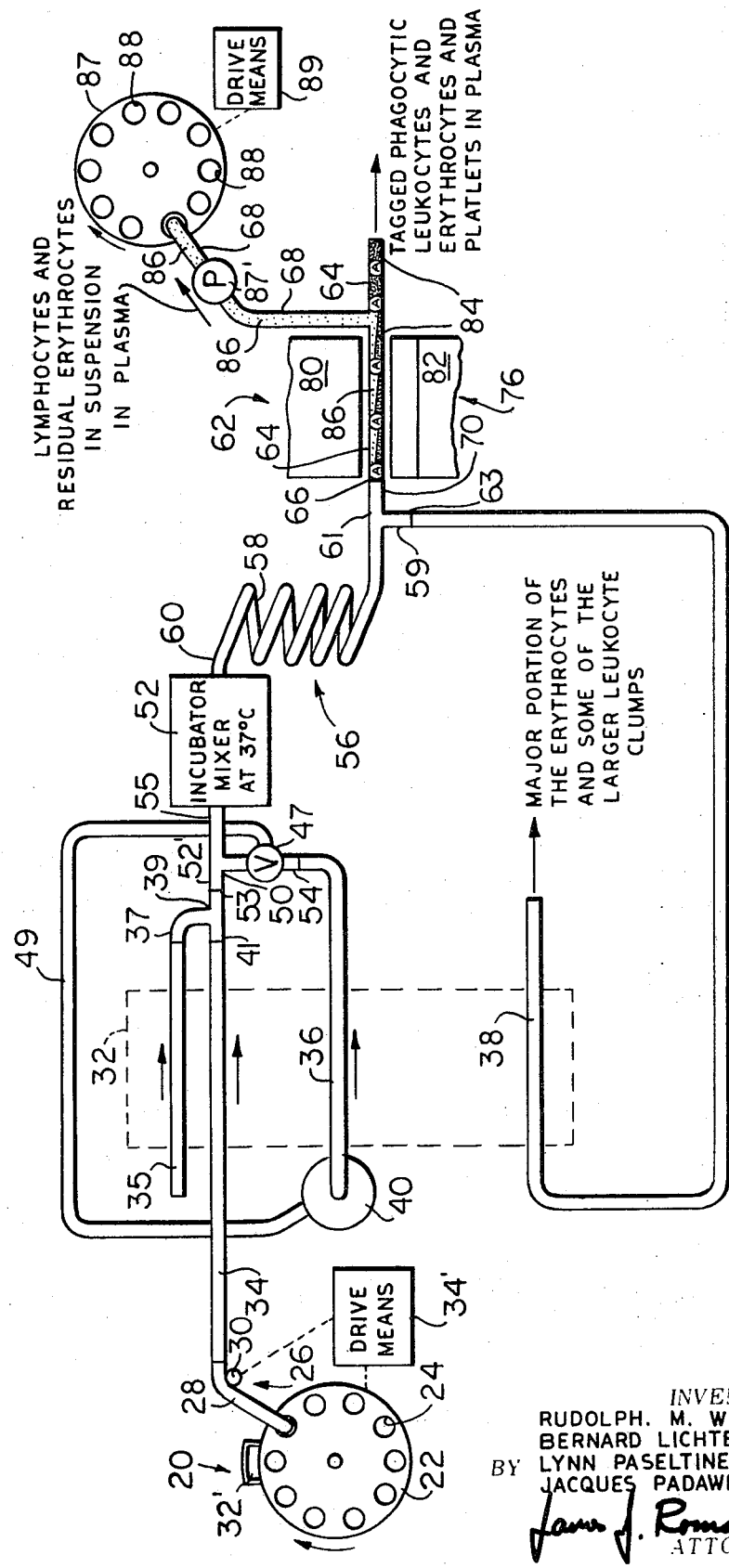
FIG. 5 is a schematic flow diagram of apparatus constructed and operative in accordance with the teachings of this invention and incorporating a first form of magnetic lmyphocyte separation means therein.

Referring now for a more detailed description of the method and apparatus to FIG. 5 which depicts a first form of apparatus constructed and operative in accordance with the teachings of this invention for the rapid, fully automatic separation of the lymphocytes from a succession of whole blood samples from different patients on a continuous flow basis, whole blood sample supply apparatus are indicated generally at 20 and may, for example, take the general form of those shown and described in U.S. Pat. 3,134,263 issued May 26, 1964 to Edward B. M. De Jong and assigned to the assignee hereof.

The apparatus 20 comprise a turntable 22 upon which is disposed a generally circular array of whole blood sample containers 24. A sample off-take device is indicated at 26 and comprises a sample off-take probe 28 and probe operating means 30, respectively. A wash liquid receptacle 32' is disposed as shown adjacent the turntable 22, while drive means are indicated at 34' and are operatively connected as indicated by the dashed lines to drive each of the turntable 22 and the sample off-take probe operating means 30. Each of said whole blood sample containers is filled with a whole blood sample from a different patient which is treated as described hereinabove with EDTA to form "EDTA blood."

In operation, the turntable 22 is intermittently rotated, or indexed, to present each of the blood serum sample containers 24, in turn, to the sample off-take probe 28, while the latter is, in turn, intermittently operated to immerse the inlet end of said probe in a thusly presented whole blood sample container for a predetermined period of time to aspirate (as described in detail hereinbelow) a predetermined volume of the blood sample therefrom, to then transfer the said off-take probe inlet end through the ambient air for immersion in the wash liquid receptacle 32' for a predetermined period of time to thus aspirate a predetermined volume of ambient air for use as a separating and cleansing fluid, followed by a predetermined volume of said wash liquid therethrough, and to again transfer the said off-take probe inlet end through the ambient air for immersion in the next presented sample container 24 for a predetermined period of time, to thus aspirate another predetermined volume of ambient air therethrough and commence the aspiration of a like, predetermined volume of the blood sample from said next presented sample container.

As a result, it may be understood that a series stream consisting of successive, predetermined volumes of said whole blood samples as spaced, in each instance, by a segment of air, a segment of the wash liquid, and a segment of air, respectively, will be supplied to the sample off-take probe 28.

A proportioning pump which may, for example, take the form of that shown and described in U.S. Pat. 3,227,091, issued Jan. 4, 1966 to Jack Isreeli et al. and assigned to the assignee hereof, is indicated generally in dashed lines at 32 and comprises compressible pump tubes 34, 35, 36 and 38 which are simultaneously compressible by a plurality of non-illustrated pump rollers in the direction from left to right as seen in FIG. 5 to pump fluids therethrough in said direction, with the relationships between the respective flow rates through said pump tubes being precisely determinable by the respective internal tube diameters.

The inlet end of compressible pump tube 34 is connected as shown to the outlet and of the probe 28 whereby may be understood that said whole blood sample series stream will be pumped through and pump tube.

The outlet of compressible pump tube 34 is connected as shown to one inlet 41 of a junction conduit as indicated at 39. The inlet end of compressible pump tube 35 is left open as shown to atmosphere for the aspiration of ambient air therethrough attendant the operation of the pump 32. The outlet end of compressible pump tube 35 is connected as shown to the other inlet 37 of junction conduit 39 for merger of the whole blood sample stream and the ambient air in said junction conduit with resultant intra-sample air segmentation of each of the whole blood samples, and like air segmentation of each of the wash liquid slugs.

A container is indicated at 40 and contains the separating agent having the constitutents discussed hereinabove. More specifically, the container 40 contains a mixture of the magnetic particles, as sensitized by the positively charged basic poly amino acid or polypeptide in a solution of the dextrose which may be prepared in the following manner. A solution of approximately 5% dextrose in distilled water is mixed with said basic poly amino acid or polypeptide in a ratio of approximately 1 part by weigtt of the latter to approximately 10,000 parts by weight of the former to give an approximately 0.01% solution of the basic poly amino acid in the dextrose solution. To this is then added approximately 100 parts by weight of the magnetic particles, and the resultant mixture is incubated, for example, at approximately 4° C. for approximately 30 minutes and then spun down by centrifuging to concentrate the magnetic particles. The excess liquid is then poured off and the magnetic particles then re-suspended in approximately 10,000 parts by weight of the dextrose solution to arrive at the final suspension which is contained in container 40, it being understood that the incubaiton as described will effect the adsorption of the basic poly amino acid or polypeptide onto the surfaces of the magnetic particles to thus sensitize the latter by materially increasing the positive surface charge thereon to enhance the leukoadhesive and phagocytic processes as described hereinabove, with the dextrose providing the energy therefor.

Further included in the separating agent in container 40 is an isotonic salt solution of the calcium chloride and magnesium chloride solutions which provide the positive free ions needed for leukoadhesion and phagocytosis, the Hanks BSS which provides the physiological solution medium, a further quantity of the dextrose solution, the minimum amount of heparin required to prevent clotting during the lymphocyte separation process, and the sedimenting agent which comprises a combination of the erythrocyte settling agent and the monosodium or disodium salts of EDTA, which does not counteract the effect of the separating process.

The inlet end of the compressible pump tube 36 is immersed as shown in the container 40 whereby the separating agent will be pumped therethrough in the indicated direction.

A junction conduit is indicated at 50 and the inlets 52' and 54 thereof are respectively connected as shown to the outlet 53 of the junction conduit 39, and the outlet of the compressible pump tube 36 whereby may be understood that each of the separating agent from container 40 and the series stream of air-segmented whole blood samples from the respective sample containers 24 will be merged in junction conduit 50. A three-way valve is indicated at 47 and is disposed as shown in junction conduit inlet 54. A return conduit 49 connects valve 47 to separating agent container 40. In a first position thereof, valve 47 is operable to enable flow through said junction conduit inlet. In a second position thereof valve 47 is operable to divert flow from compressible pump tube 36 for return to container 40 through conduit 49. Preferably, and through appropriate choice of the respective internal diameters of compressible pump tubes 34, 36 and 38, a ratio of approximately 4 parts by volume of the separating agent to approximately 1 part by volume of the whole blood sample series stream is achieved in junction conduit 50.

An incubator-mixer is indicated at 52 and the outlet 55 of junction conduit 50 is connected thereto as shown for flow of the blood sample-separating agent mixture stream therethrough for thorough mixing and incubation thereof. Preferably, the incubator-mixer is maintained at an incubation temperature of approximately 37° C., and the flow rate therethrough of said final mixture chosen to provide for a residence time in said incubator-mixer of approximately 30 minutes. It is, of course, during this incubation time that the major portion of the tagging of the phagocytic leukocytes by leukoadhesion of the sensitized magnetic particles to the neutrophils, monocytes, eosinophils, and basophils, phagocytosis of said sensitized magnetic particles by said phagocytic leukocytes, and clumping of the latter, will occur.

Sedimentation means are indicated generally at 56 and comprise generally horizontally oriented races of connected settling tubing as shown at 58. The inlet 60 of the sedimentation means 56 is connected to the outlet of the incubator-mixer means 52 for the flow of the suitably mixed and incubated blood sample-separating agent mixture stream through said sedimentation means. This will result in settling of the aggregated erythrocytes—as promoted by the sedimenting agent—to the lower portion of the mixture stream, and in general settling of the tagged phagocytic leukocytes which are somewhat heavier due to the attachment thereof to the sensitized magnetic particles and clumping thereof, along with some measure of the platelets, to said lower stream portion.

Cross decanting conduit means are indicated at 59 and are operatively connected as shown in the outlet conduit 61 of the sedimentation means 56. The inlet end of compressible pump tube 38 is connected to the outlet 63 of the decanting conduit means 59 to pump fluids therefrom in obvious manner. Accordingly, it may be understood that flow of the appropriately settled blood sample-separating agent mixture stream from the sedimentation blood sample-separating agent mixture stream from the sedimentation means 56 through the outlet conduit 61 of the latter will result in the removal as indicated of the major portion of the sedimented erythrocytes, plus some portion of the larger tagged leukocyte clumps, and platelets, through the decanting conduit means 59 and the connected compressible pump tube 38. The portion of the blood sample-separating agent mixture stream removed as described through decanting conduit means 59 may, for example, constitute approximately 25% by volume of the same.

Magnetic lymphocyte separation means are indicated generally at 62 and comprise a substantially horizontal conduit 64 having an inlet 66, and having an outlet nipple 68 extending therefrom as shown. The outlet 70 of the sedimentation means outlet conduit 61 is connected to the inlet 66 of the conduit 64 for flow of the appropriately settled stream of the mixture of the tagged phagocytic leukocytes and platelets, the untagged lymphocytes, the remaining erythrocytes, and the plasma, through the magnetic separation means 62.

Figure 6:
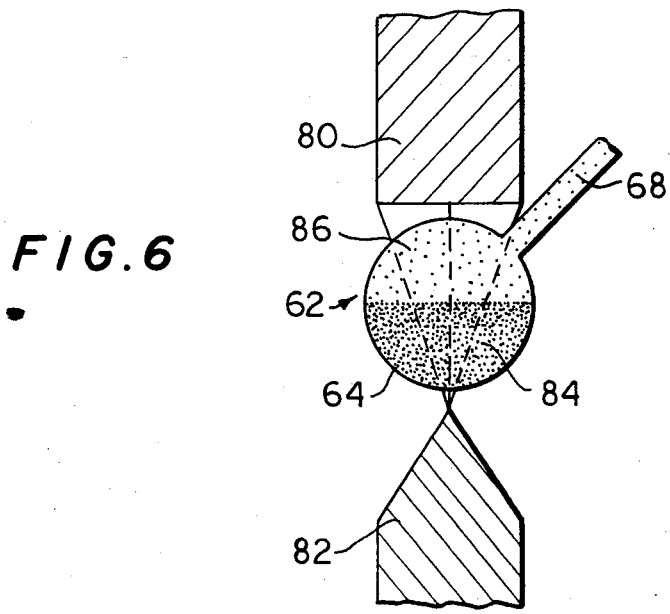
FIG. 6 is a vertical cross-sectional view taken through the magnetic separation means of FIG. 5.

Further included in the magnetic separation means 62 are magnetic means 76 which may, for example, take the form of a Stern-Gurlach magnet comprising magnetic members 80 and 82 respectively disposed as shown immediately above and below the substantially horizontal conduit 64. The magnetic means 76 are effective to generate a substantially vertically oriented, high gradient or non-uniform magnetic field which will pass through the conduit 64 in the manner clearly illustrated by the dashed lines in FIG. 6.

In operation, as each of the mixture stream segments flows through the conduit 64, it may be understood that the higher magnetic field gradient in the lower part of said conduit will cause the tagged phagocytic leukocytes to be pulled downwardly thereby shifting the overall white cell distribution so that the upper portion of each of said segments contains a far greater percentage of the lymphocytes than does the lower portion thereof. Accordingly, each of said mixture stream segments will be substantially divided into a lower segment portion as indicated at 84 and containing the tagged phagocytic leukocytes and platelets and many of the remaining erythrocytes, and an upper segment portion as indicated at 86 and containing the vast majority of the untagged live lymphocytes plus the small residual amount of the erythrocytes.

Following this, and while the segmented stream is still substantially under the influence of the magnetic means 76, substantially the entire upper portion 86 of each of the stream segments will be pumped out via outlet nipple 68, as by pump 87', while the remainder of said segmented stream is flowed as indicated through the outlet of conduit 64.

The provision as described of the high gradient or non-particle bridging or the like to thus substantially minimize magnetic particle or blood cell entrapment in the conduit 64 with resultant further advantageous increase in separation process yield.

That portion of each of said segments which is pumped out as described through the outlet nipple 68 will contain, in suspension in the blood plasma, a very high percentage of the live lymphocytes from the relevant whole blood sample due to the forced shift of the tagged phagocytic leukocytes to the bottom of the conduit 64 as described under the influence of the substantially vertically oriented, high gradient or non-uniform magnetic field generated by the magnetic means 76, plus a small residual amount of the erythrocytes from said whole blood sample due to the fact that a major portion of the erythrocytes will have been removed as described through decanting conduit means 59, while many of the remaining erythrocytes will remain entrapped by the tagged phagocytic leukocytes, suspended as should be obvious in some measure of the blood plasma.

Collection of the lymphocyte-erythrocyte-plasma suspension for each of the whole blood samples from the respective sample containers 24 on the turntable 22 may be readily and independently effected, for example, by the operative disposition, relative to the outlet end of outlet nipple 68, of a second turntable 87 having a generally circular array of suspension collection containers 88 disposed thereon as shown—there being one of said collection containers for each of said whole blood samples—and the indexing of said second turntable under the control of drive means 89 in obvious phase relationship with the flow of each of said lymphocyte-erythrocyte-plasma suspensions from the outlet end of said outlet nipple to effect the desired independent suspension collection. Alternatively, it is believed clear that other and different forms of collection means may be utilized to effect the independent collection of the lymphocyte-erythrocyte-plasma suspensions of interest.

Separation of the lymphocytes from each of the thusly collected lymphocyte-erythrocyte-plasma suspensions, as may, of course, contain a very small measure of contaminating cells in the nature of platelets, eosinophils and/or basophils, may, if desired, be readily effected in each instance with a very high degree of efficiency by simple hemolysis and subsequent lymphocyte wash and resuspension in manner well known to those skilled in this art.

Following the flow of the air-segmented mixture of the separating agent and each whole blood sample from a container 24 through the magnetic separating means 62 it may be understood that an appropriately air-segmented slug of the wash liquid from reservoir 32 will be flowed through the apparatus of the invention to remove any sample residue and substantially prevent inter-sample contamination to obviously significant advantage. As this occurs, valve 47 will be moved to the second position thereof to bypass the separating agent back to container 40 to thereby materially increase the efficiency of the wash operation and prevent waste of said separating agent. In addition, and as the flow of said air-segmented wash liquid slug through the magnetic separating means 62 is commenced, it may be understood that the influence of the magnetic field of the magnetic separating means 62 on conduit 64 will be removed—through a simple de-energization of the magnets or, alternatively, by the actual physical movement of the said conduit away from the same—to further materially increase the efficiency of the wash operation by rendering the residual magnetic particles and red and white blood cells which may be tagged thereby more readily removable by the air-segmented wash liquid slug.

Figure 7:
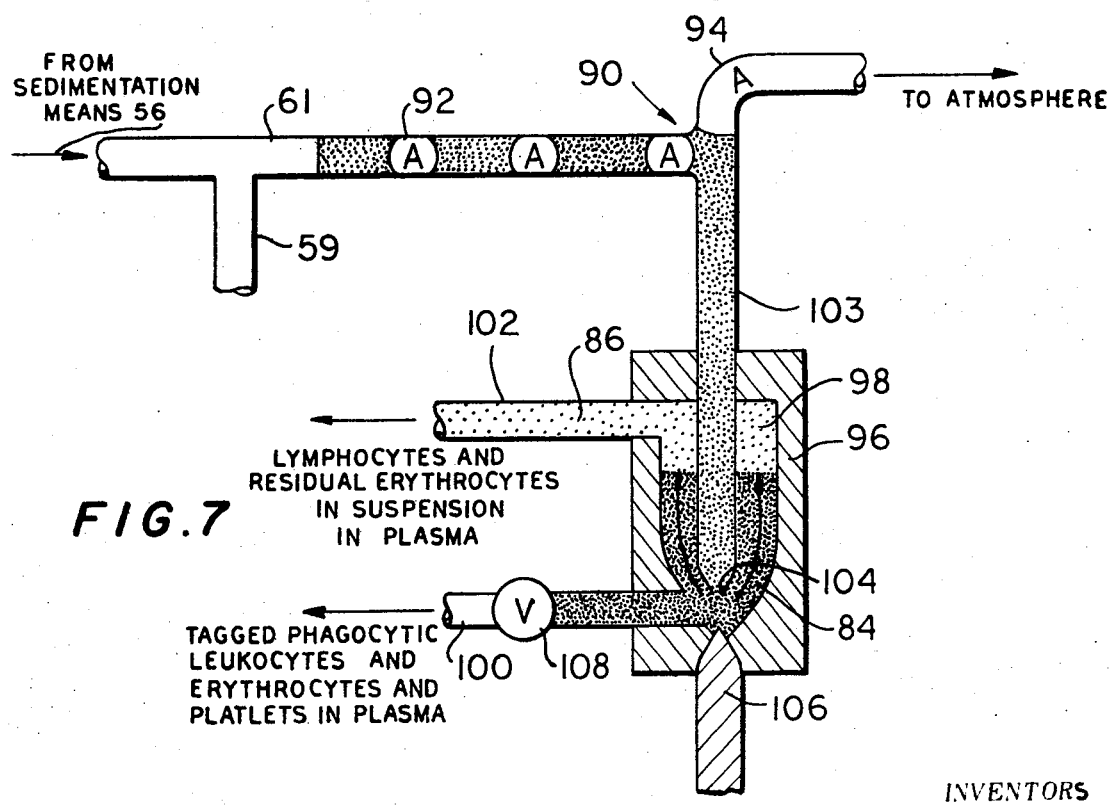
FIG. 7 is a schematic flow diagram of a second form of magnetic lymphocyte separation means for use in the apparatus of FIG. 5.

Another form of magnetic separating means, for use as described with the sample supply means 20, pump 32, incubator-mixer 52 and sedimentation means 56 of FIG. 5, are indicated generally at 90 in FIG. 7 and comprise a conduit 92, the inlet of which is connected as indicated to the outlet conduit 61 of said sedimentation means. De-bubbler means are indicated at 94 and extend as shown from the extremity of the conduit 92 to effect de-bubbling of the segmented whole blood sample suspension stream in obvious manner.

A separation chamber housing is indicated at 96 and forms a separation chamber 98 which is disposed as shown substantially vertically below the extremity of conduit 92; a lymphocyte outlet 102 and a drain 100 are provided as shown adjacent the respective upper and lower extremities of the separation chamber 98.

A central tube 103 extends downwardly as shown from said conduit extremity generally centrally of said separation chamber. The central tube 103 terminates as shown in a restricted aperture 104 which is magnetized by the non-uniform high gradient magnetic field from magnet 106 which is disposed as shown in the separation chamber housing 96 immediately below said aperture.

In operation with drain 100 closed as by valve means 108, and as described for the separation of the lymphocytes from one segmented whole blood sample mixture of the series stream thereof, it may be understood that as said segmented sample stream is pumped from the sedimentation means 56 (FIG. 5) through conduit 61, the same will be debubbled by debubbler means 94, and the resultant, now continuous mixture stream for said whole blood sample of interest flowed downwardly through central tube 103 to exit therefrom through the magnetic aperture 104 into the separation chamber 98 to fill the latter. As this occurs, the tagged phagocytic leukocytes, platelets, and many of the remaining erythrocytes as again indicated at 84, will be retained in the lower portion of the separation chamber 98 by the non-uniform magnetic field existing therein and which is, of course, suitably polarized to attract the suspended magnetic particles, while the untagged lymphocytes and some portion of the erythrocytes and plasma, as again indicated at 86, will rise to the top of said chamber and flow therefrom for collection through lymphocyte outlet 102.

At the completion of the flow as described of the whole blood sample mixture of interest through the magnetic separating means 90, and substantially concomitantly with the commencement of the flow of the intervening inter-sample air, wash liquid and air segments therethrough, it may be understood that the valve 108 is initially maintained closed to effect thorough wash of the upper portion of the separation chamber 98 and the lymphocyte outlet 102. Following this, the valve 108 is opened to open drain 100, and the relevant magnetic field reduced to zero, whereby the residue of the tagged phagocytic leukocytes, plus a major portion of the platelets and some measure of the erythrocytes, as have been trapped in the lower portion of the separation chamber 98 will be washed therefrom through the drain 100 in preparation for the next lymphocyte separation sequence.

Collection of the resultant lymphocyte-erythrocyte-plasma suspension, and highly efficient separation of the lymphocytes therefrom may, of course, then be effected in the manners described hereinabove with a regard to the operation of the magnetic separation means 62 of FIG. 5.

Actual utilization of the method of the invention for the separation as described of the lymphocytes from whole blood samples has proven effective to provide for such separation with a heretofore unattainable combination of, on the average, approximately 97% purity, approximately 80% yield, and 99% viability.

Although disclosed hereinabove by way of example as applicable to the highly efficient separation of the lymphocytes from a series of relatively low volume whole blood samples from different patients, it is believed clear that the method and apparatus of the invention are equally applicable to the separation of the lymphocytes on a batch basis from a relatively high volume combination of whole blood samples from different patients depending, of course, upon the nature of the utilization which is to be made of the separated lymphocytes.

Too, it is believed clear that the various separating agent constituents may, of course, be contained in a plurality of containers and automatically mixed in predetermined proportion through use of additional compressible pump tubes and appropriately connected junction conduits. Also, recycling of the lymphocyte-erythrocyte-plasma of interest through the apparatus may, in each instance, be effected to provide for even greater purity.

While we have shown and described the preferred embodiment of our invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. A method for the separation of the lymphocytes from a blood sample, comprising the steps of, mixing said blood sample with a separating agent including magnetic particles having absorbed thereon a sensitizing material to increase positive surface charge thereon so as to enhance phagocytic tagging by said magnetic particles of the leukocytes to said blood sample, said sensitizing material being a polypeptide, incubating the resultant blood sample-separating agent mixture to effect phagocytic tagging of the leukocytes of said blood sample by said magnetic particles, to the substantial exclusion of said lymphocytes, through leukoadhesion, phagocytosis and clumping, respectively, and passing the incubated blood sample-separating agent mixture through magnetic separating means to separate the tagged leukocytes from the lymphocytes.

2. A method as in claim 1, further comprising the steps of passing said blood sample-separating agent mixture through sedimentation means to promote erythrocyte aggregation and settling, and removing the major portion of the thusly settled erythrocytes from said blood sample-separating agent mixture.

3. A method as in claim 1 wherein said sensitizing material is a basic poly amino acid.

4. A method as in claim 1 wherein said sensitizing material is selected from the group comprising the D, DL, or L forms of polylysine, polyarginine, polyornithine, and polycitrulline.

5. A method as in claim 1 wherein said sensitizing material is polylysine.

6. A method as in claim 1 wherein, said separating agent further comprises an isotonic solution of the same osmotic pressure as blood plasma to provide a physiological solution medium for lymphocyte separation and a dextrose solution to provide energy for the phagocytic process.

7. A method as in claim 6 wherein said separating agent further comprises an anti-coagulant to prevent blood sample clotting during lymphocyte separation.

8. A method as in claim 6 wherein said sedimenting agent comprises a high molecular weight settling agent and EDTA.

9. A method as in claim 1 further comprising, the steps of, physiologically stabilizing said blood sample, prior to the mixture thereof with said separating agent, by the mixture thereof with a chelating agent to inhibit clotting and effect the binding of the free positive ions of said blood sample to thus inhibit leukoadhesion and phagocytosis, said chelating agent being selected from the group consisting of EDTA, disodium salts of EDTA, tripotassium salts of CHEL DPTA, sodium salts of CHEL DPTA, and sodium salts of CHEL DM Acid.

10. A method as in claim 9 wherein said blood sample is a whole blood sample and the physiological stabilization thereof is effected by the mixture thereof with said chelating agent substantially concomitantly with the withdrawal thereof from the donor.

11. A method as in claim 9 wherein, said separating agent further comprises free magnesium and calcium ions which are effective to replace the free positive ions bound by the chelating agent and restore the ionic content of the blood sample to a level which is conducive to leukoadhesion and phagocytosis.

12. In a method as in claim 11 wherein said separating agent further comprises an anti-coagulant to inhibit blood clotting during the lymphocyte separation procedure.

References Cited

Tullis, Blood, vol. 7 pp. 891–896, 1952.

RICHARD L. HUFF, Primary Examiner

U.S. Cl. X.R.

195—32; 252—182, 62.51